United States Patent [19]

Buschmann et al.

[11] Patent Number: 4,653,077

[45] Date of Patent: Mar. 24, 1987

[54] TIMING DEVICE FOR NEUTRALIZING RESPONSE DELAYS OF CONTROL DEVICES IN PRINTING MACHINES

[75] Inventors: Falk Buschmann, Coswig; Karl-Heinz Foerster, Dresden; Volker Eichler, Weinboehla; Hartmut Heiber, Radebeul; Volkmar Dittrich, Coswig, all of German Democratic Rep.

[73] Assignee: VEB Kombinat Polygraph "Werner Lamberz" Leipzig, Leipzig, Fed. Rep. of Germany

[21] Appl. No.: 674,024

[22] Filed: Nov. 21, 1984

[30] Foreign Application Priority Data

Nov. 24, 1983 [DD] German Democratic Rep. ............................. 2570611

[51] Int. Cl.⁴ .............................................. G06F 7/38
[52] U.S. Cl. ........................................ 377/2; 377/26; 377/16
[58] Field of Search ................... 377/2, 16, 19, 26, 41, 377/17; 101/216, DIG. 25

[56] References Cited

U.S. PATENT DOCUMENTS

| | | | |
|---|---|---|---|
| 3,064,889 | 11/1962 | Hupp | 377/44 |
| 3,752,969 | 8/1973 | Kiffmeyer et al. | 377/2 |
| 3,763,364 | 10/1973 | Deutsch et al. | 377/26 |
| 4,109,574 | 8/1978 | Forster et al. | 101/216 |
| 4,408,118 | 10/1983 | Grözinger et al. | 377/2 |
| 4,433,426 | 2/1984 | Forster et al. | 377/16 |

Primary Examiner—Stanley D. Miller
Assistant Examiner—K. Ohralik
Attorney, Agent, or Firm—Michael J. Striker

[57] ABSTRACT

A device for generating timing pulses for a rotary printing machine includes generators for generating synchronizing pulses and a pulse sequence corresponding to increments of angle of rotation of the machine. A pulse processing circuit includes address counters connected to the pulse generating means and being preset by an address presetting device. The output of the one address counter is connected to a PROM storing predetermined sequences of timing pulses. In order to provide for shifting of the stored timing pulse sequences in a negative direction, an inverting member is connected in the data bus between the rotary speed counter and the address presetting device of the one address counter. The inverting member can include either negators or storing means programmed with complementary values.

3 Claims, 3 Drawing Figures

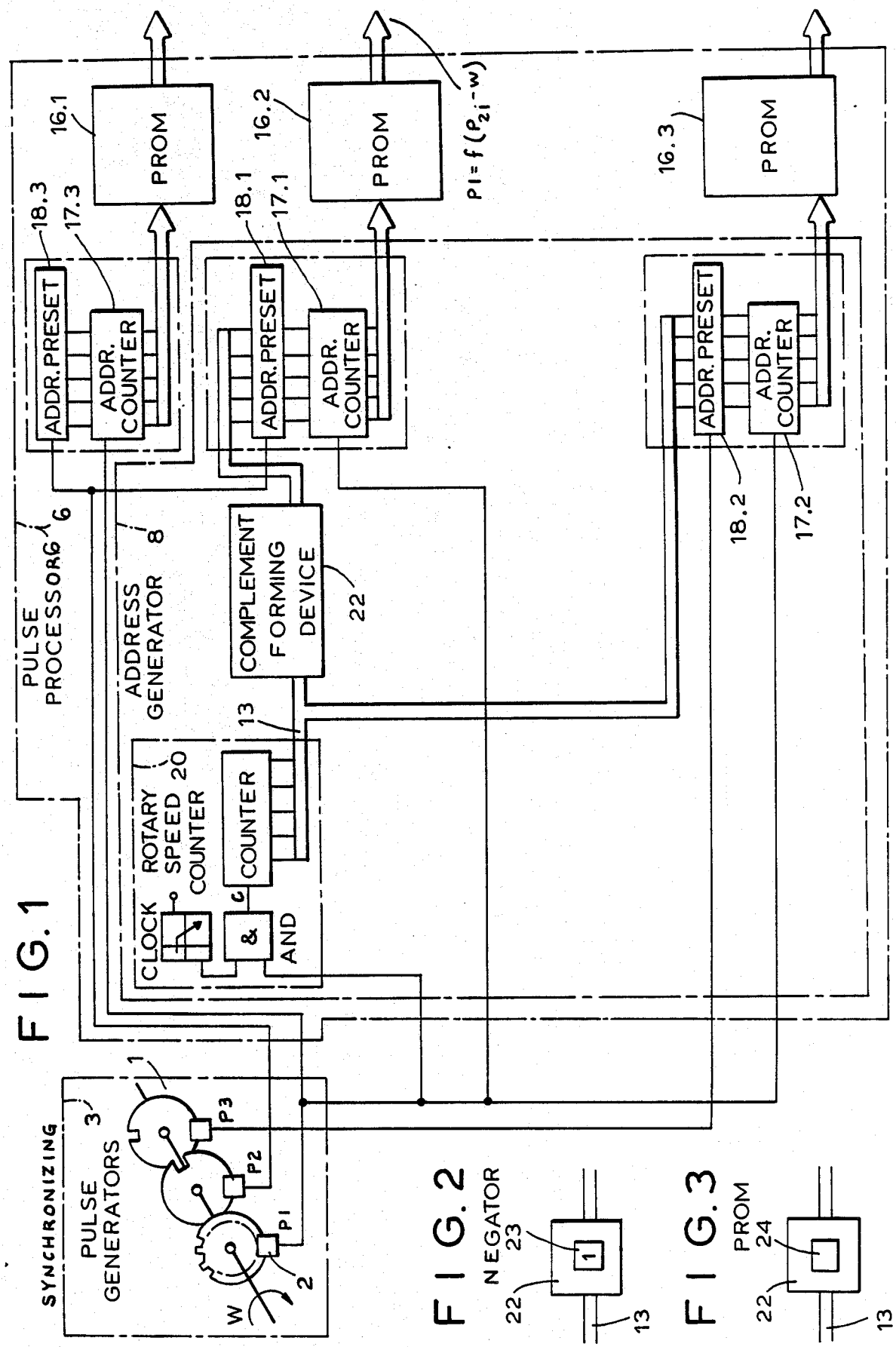

TIMING DEVICE FOR NEUTRALIZING RESPONSE DELAYS OF CONTROL DEVICES IN PRINTING MACHINES

BACKGROUND OF THE INVENTION

The present invention relates in general to a timing device for use in connection with a rotary printing machine having control means for its setting means. In particular, the invention relates to a timing device of the kind which includes means for generating pulses corresponding to angular increments of the machine, means for generating at least one synchronizing pulse during a cycle of the machine, a pulse processing circuit connected to the pulse generating means and including a circuit for producing binary addresses pertaining to angles of rotation and to rotary speeds of the machine, the address producing means including rotary speed counter having an input coupled to the pulse generating means corresponding to the angular increments, address presetting members each having a resetting input connected to the means for generating a single synchronizing pulse, parallel data inputs and outputs, address counters each having a data input connected to the means for generating angular increment pulses, parallel presetting inputs connected via a data bus to the outputs of the address presetting means, and parallel count outputs; means for storing binary data corresponding to predetermined pulses sequences, the storing means having addressing inputs connected to the count outputs of the address counter and outputs connectable to the control means. The storing means is preferably in the form of a programmable read only memory (PROM).

The timing device of this kind permits a positive neutralization $\Delta P = f(w)$ of response delays of setting members of the machine for unoperative times of control means for the setting members. The term "positive neutralization response delays" means the actuation of control means for the setting members which occurs earlier in time and performed at higher speeds, in contrast to retarded actuation of the control means at lower speeds. The positive neutralization $\Delta P$ is a function of a positive increment of the angular velocity $(+W)$ of the machine. A negative neutralization is a function of a negative increment of the angular velocity $(-W)$.

A negative neutralization of the operation delays $\Delta P = f(-W)$ of the control means which is needed for example for processing signals from intermittently operating measuring devices on printing machines, is not possible with prior art timing device of this kind.

SUMMARY OF THE INVENTION

It is therefore a general object of the present invention to overcome the aforementioned disadvantage.

More particularly, it is an object of the invention to provide an improved timing device for rotary printing machines which permits neutralization both of a positive and of a negative response delay of control means for setting members of the machine.

In keeping with these objects and others which will become apparent hereafter, one feature of the invention resides, in a timing device of the afore-described kind, in a combination which comprises an inverting member connected in the data bus between the parallel outputs of the rotary speed counter and one of the address presetting means to perform binary complementary operations on the transferred data.

The inverting member includes a negator forming a first complement of the transferred data or a storing member in the form of a PROM programmed for producing a second complement of the transferred data.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing.

BRIEF DESCRIPTION OF THE DRAWING

FIG. 1 is a block circuit diagram of the timing device of this invention;

FIG. 2 is a schematic block diagram of an embodiment of an inverting member in the device of FIG. 1; and FIG. 3 is a modification of the inverting member in the device FIG. 1.

DESCRIPTION OF THE PREFERRED EMBODIMENT

The timing device shown schematically in the block circuit diagram in FIG. 1 includes a pulse generator 1 for producing during a cycle of the printing machine a first synchronizating pulse $P_3$, a pulse generator 3 producing a second synchronizing pulse $P_2$ and a pulse generator 2 producing a succession of pulses $P_1$ corresponding to the increments of angle of rotation of the machine.

The timing device further includes a pulse processing circuit 6 including a circuit 8 for producing addresses pertaining to angle of rotation or rotary speed of the machine, and storing devices 16.1 through 16.3 in the form of programmable read only memories PROM.

The circuit for producing angle of rotation/rotary speed addresses 8 includes a rotary speed counter 20 and address counters 17.1 through 17.3 cooperating with address presetting devices 18.1 through 18.3.

In this example, the address presetting device 18.2 is directly connected via a data bus 13 to the outputs of the rotary speed counter 20 while the address presetting device 18.1 is connected to the output of the device 20 via a complement forming device 22.

The complement forming device 22 includes either a negator 23 (FIG. 2) producing a complement for each bit transferred through the data bus 13. In a modification, the device 22 includes a storing device 24 (FIG. 3) in the form of a PROM programmed to perform complementary operation on the bits transferred through the data bus.

The operation of the timing device of this invention is as follows:

After the address counters 17.1 and 17.3 have been reset to zero by the synchronizing pulses $P_2$ and counter 17.2 by pulses $P_3$ from the pulse generators 1 and 3, the angular increment pulses $P_1$ from the pulse generator 2 are applied to serial data inputs of respective address counters 17.1 through 17.3.

These pulses $P_1$ corresponding to increments of angle of rotation of the printing machine are continuously added in respective address counters and the resulting count in the form of a binary code appears at the outputs of respective address counters 17.1 through 17.3 and is applied in parallel to the addressing inputs of corresponding PROM storing devices 16.1, 16.2 and 16.3. Each PROM stores bit patterns corresponding to predetermined sequences of neutralization pulses which after being addressed by the address counters, appear at the outputs of respective storing devices 16.1, 16.2 and 16.3. The rotary speed counter 20 counts the increments of angle of rotation per a time unit and produces at its output a binary word corresponding to increments of angle of rotation whose value depends on the rotary speed of the machine. This binary word is applied via a data bus 13 to parallel inputs of address presetting devices 18.1 and 18.2. Due to the presetting of corresponding address counters 17.1 and 17.2 by the rotary speed dependent value of the binary word, the count in the address counters 17.1 and 17.2 is affected by changes of rotary speed W or $-W$ in positive or negative direction and there results a rotary speed dependent shift in the neutralizing pulse sequences readout from the PROM storing devices in accordance with equation $\Delta P = f(w)$.

For example, in order to shift the pulse sequences stored in the storing device 16.2 in a negative direction, then according to this invention a corresponding address presetting device 18.1 is set by a binary code from the rotary speed counter 20 which has been inverted by the complement forming device 22. The inversion occurs either by the formation of the first complement in a negator 23 (FIG. 2) or by the second complement readout from the programmable read only memory PROM (FIG. 3).

The complement $\overline{X}$ of a number (count) x is employed for processing negative binary counts.

The first complement x of a number is created by the negation of all places of the binary number, or mathematically expressed $$\overline{X} = +X + k_1 \text{ for X less than zero}$$

whereby $k_1$ is a complementary binary number for the formation of the first complement.

For binary numbers, $k_1$ is defined as follows:

$$k_1 = 2^N - 1$$

whereby N is the length of the binary word transmitted through the rotary speed data bus 13.

The second complement of a binary number is created by the negation of all bits of the number and by the subsequent addition of 1 to the least significant or, expressed mathematically $$\overline{X} = +X + k_2 \text{ for X less than zero,}$$

whereby $k_2$ is the complementary number for the creation of the second complement and is defined as follows:

$$k_2 = 2^N$$

The inverted binary codes applied via the address presetting 18.1 to setting inputs of the assigned address counter 17.1 where the negated number is added to the pulses P1 from the pulse generator 2 and the resulting count is applied to the address inputs of the corresponding store 16.2 which in turn delivers at its output a sequence of timing pulses $p_1 = f(p_2; -w)$ which neutralize response delay of non-illustrated control devices.

The response delays of a particular control device for different changes of angular velocities of the machine are known, and the corresponding pulse sequences p1 for neutralizing the delays at decreasing rotary speeds are stored in the PROM 16.2.

It will be understood that each of the elements described above, or two or more together, may also find a useful application in other types of construction differing from the types discussed above.

While the invention has been illustrated and described as embodied in a specific example of a device for generating timing pulses for setting members of a printing machine, it is not intended to be limited to the details shown since various modifications and structural changes may be made without departing in any way from the spirit of the present invention.

Without further analysis the foregoing will so fully reveal the gist of the present invention that others can, by applying current knowledge, readily adapt it for various applications without omitting features, that from the standpoint of prior art, fairly consitute essential characteristics of the generic or specific aspects of this invention.

What is claimed as new and desired to be protected by Letters Patent is set forth in the appended claims:

1. A device for generating timing pulses for neutralizing response delays of control devices in a rotary printing machine, comprising means for generating pulses corresponding to angular increments of the machine, means for generating synchronizing pulses during a cycle of the machine, a pulse processing circuit including means for producing binary addresses indicative of momentary rotary speed of the machine, said address producing means including a rotary speed counter having parallel count outputs connected to a data bus and an input coupled to said pulse generating means corresponding to the angular increments; address presetting members each having parallel data outputs and a resetting input connected to said means for generating synchronizing pulses, and at least one of said address presetting members having parallel data inputs; address counters each having a serial data input connected to said means for generating angular increment pulses, parallel presetting inputs connected to the parallel data outputs of said address presetting means, and parallel count outputs; means for storing binary data corresponding to predetermined neutralizing pulse sequences, one of said storing means having addressing inputs connected to count outputs of one address counter cooperating with said one address presetting member having the parallel data inputs; a complement forming member connected in said data bus between the parallel data inputs of said one address presetting member and the parallel count outputs of said rotary speed counter to produce an complement of the data transferred to said one address presetting member thus causing a generation of an address in said one counter indicative of rotational direction and rotary speed of the machine.

2. A device as defined in claim 1 wherein the complement forming device includes at least one negator for producing a complement of binary data passing through said data bus.

3. A device as defined in claim 1 wherein the complement forming device includes storing means in the form of a programmable read only memory containing complements for binary data transferred by the data bus.

* * * * *